J. BUEB.
GAS FURNACE.
APPLICATION FILED JAN. 21, 1908.
928,494.
Patented July 20, 1909.
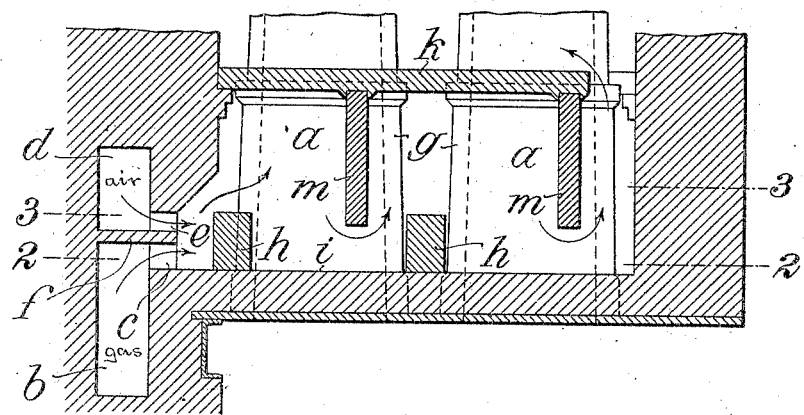
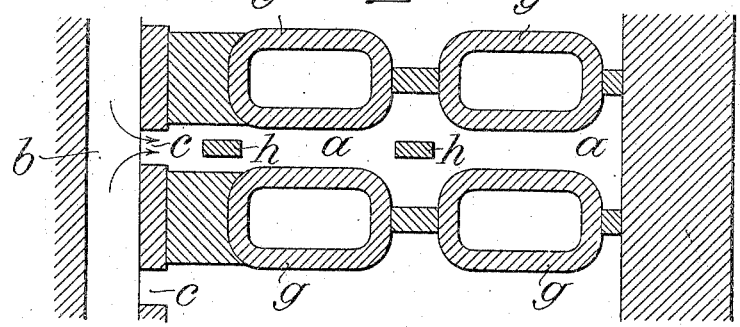
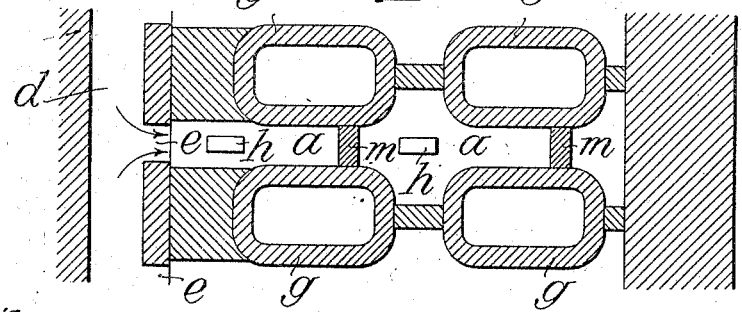

UNITED STATES PATENT OFFICE.

JULIUS BUEB, OF DESSAU, GERMANY

GAS-FURNACE.

No. 928,494.  Specification of Letters Patent.  Patented July 20, 1909.

Application filed January 21, 1908. Serial No. 412,013.

*To all whom it may concern:*

Be it known that I, JULIUS BUEB, a resident of Dessau, Germany, a subject of the Emperor of Germany, have invented certain new and useful Improvements in Gas-Furnaces, of which the following is a specification.

This invention relates to gas furnaces and more particularly those for the heating of retorts by producer gas and has for its object to enable the manner in which the heat is applied to the retorts to be regulated.

According to this invention gas and air enter the combustion chamber in approximately parallel streams and the blending of these currents so as to produce variations in the strength of the mixture and in the resultant heat obtained is effected by the disposition in the combustion chamber of bricks or the like which constitute baffles, the position of which can be adjusted.

The accompanying drawing illustrates by way of example a gas furnace provided with vertical retorts and constructed in accordance with the present invention.

Figure 1 is a vertical section through the combustion chamber of the furnace. Fig. 2 is a horizontal section on the line 2—2 of Fig. 1. Fig. 3 is a horizontal section on the line 3—3 of Fig. 1.

Producer gas is supplied to the combustion chamber $a$ through a passage $b$ with horizontal openings $c$ and air which has previously been heated is supplied through a passage $d$ with horizontal openings $e$. The passages $b$ and $d$ are thus separated from each other by a partition $f$ and their openings are parallel or approximately parallel. The retorts $g$ are disposed in the combustion chamber $a$ in two series one behind the other. Between each pair of retorts $g$ air and gas are introduced in parallel streams through the openings $e$ and $c$. The path taken by the combustion gases is indicated by arrows in the drawing. The producer gas and air entering in the approximately parallel streams indicated first strike against a baffle $h$ placed on the hearth $i$ of the combustion chamber $a$ with the result that these streams are partly mixed whereby combustion is started. The gases deflected upward by the first baffle $h$ are then directed downward by a partition $m$ projecting downward from the roof $k$ of the chamber. The gases now impinge against a second baffle $h$ where further combustion takes place.

By means of a second partition $m$ the hot gases are again directed downward so as to come into contact with the lower corners of the outer retorts $g$, the gases finally escaping upward as indicated by the arrow in Fig. 1. In this way by employing several baffles $h$ of brick or other suitable material and placing these loosely on the hearth $i$ preferably alternately with the partitions $m$ it is possible to regulate as desired the development or generation of heat in the combustion chamber $a$. Thus for example by moving the first baffle $h$ toward the gas and air openings $c$ and $e$ it is possible to obtain a richer mixture and consequently a more intensive development of heat during an earlier stage in the combustion. Movement of the first baffle away from the openings has an opposite effect. The movement or adjustment of the baffles is effected in any suitable manner, for instance by means of pokers or other rods introduced through suitable openings.

It will be observed that gas and air issue in approximately parallel streams from the openings $c$ and $e$ respectively and if no obstruction such as the baffle $h$ were interposed, they would mix very slowly and combustion would occur practically only at the contact surface of the two streams. The first baffle $h$ produces an eddying motion and a mixing of the two streams, and this action will be the more energetic the nearer the baffle is placed to the openings $c$, $e$, where the two streams have the smallest cross section and therefore the greatest speed. The first baffle $h$ is so placed as to produce only a partial mixture and combustion, and the resulting products are passed through the contraction formed by the first partition $m$, thus giving the gases a greater speed before they are thrown against the second baffle $h$ where a further mixture and combustion takes place. I am thus enabled to spread the combustion area over a space of considerable length, and to regulate the combustion by adjusting the baffles $h$ lengthwise of the path of the gases.

I claim as my invention:—

1. In a gas furnace the combination of a combustion chamber with fixed partitions projecting downward from the roof of the combustion chamber, and baffles disposed on the hearth of the combustion chamber and adjustable lengthwise of the path taken by the gases.

2. In a gas furnace, the combination of a combustion chamber having means for discharging air and gas into it in substantially parallel streams, with a baffle adjustable toward and from said means and disposed in the path of the gas and air streams.

3. In a gas furnace, the combination of a combustion chamber having means for discharging air and gas into it in substantially parallel streams, with baffles adjustable toward and from said means, and a partition located between said baffles and extending toward the chamber wall from which the baffles project.

In testimony whereof, I have hereunto signed my name in the presence of two subscribing witnesses.

JULIUS BUEB.

Witnesses:
 WOLDEMAR HAUPT,
 HENRY HASPER.